United States Patent
Sambhwani et al.

(10) Patent No.: US 8,130,727 B2
(45) Date of Patent: Mar. 6, 2012

(54) QUASI-ORTHOGONAL ALLOCATION OF CODES IN TD-CDMA SYSTEMS

(75) Inventors: Sharad Deepak Sambhwani, San Diego, CA (US); Kee-Bong Song, Santa Clara, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 855 days.

(21) Appl. No.: 11/365,218

(22) Filed: Feb. 28, 2006

(65) Prior Publication Data

US 2007/0097855 A1  May 3, 2007

Related U.S. Application Data

(60) Provisional application No. 60/731,023, filed on Oct. 27, 2005.

(51) Int. Cl.
*H04B 7/216* (2006.01)
*H04L 12/56* (2006.01)

(52) U.S. Cl. ............ 370/335; 370/342; 370/441

(58) Field of Classification Search ........ 370/281, 370/280, 209, 330, 328, 329, 335, 342, 441
See application file for complete search history.

(56) References Cited

U.S. PATENT DOCUMENTS

| | | | | |
|---|---|---|---|---|
| 5,757,767 A | * | 5/1998 | Zehavi | 370/208 |
| 5,781,541 A | * | 7/1998 | Schneider | 370/335 |
| 5,848,060 A | * | 12/1998 | Dent | 370/281 |
| 6,038,450 A | | 3/2000 | Brink et al. | |
| 6,091,757 A | | 7/2000 | Cudak et al. | |
| 6,233,231 B1 | | 5/2001 | Felix et al. | |
| 6,370,182 B2 | | 4/2002 | Bierly et al. | |

(Continued)

FOREIGN PATENT DOCUMENTS

CN  1353887 A  6/2002

(Continued)

OTHER PUBLICATIONS

Adaptive Antennas and MIMO Systems for Wireless Communications ; Intelligent Antenna Solutions for UMTS: Algorithms and Simulation Results P-28-29 PD:00.10.2004 VN: 2460.

(Continued)

*Primary Examiner* — John Pezzlo

(74) *Attorney, Agent, or Firm* — Sandip S. Minhas; Mary A. Fales

(57) ABSTRACT

Systems and methodologies are described that facilitate increasing throughput in a time-division duplexed CDMA wireless communication environment. A set of orthogonal Walsh code sequences can be assigned to a first group of users in a network sector, and a duplicate set of orthogonal Walsh code sequences can be assigned to at least a second group of users in the sector. A number of receive antennas equal or greater than to the number of duplicate code sets being assigned can be deployed to linearly scale sector capacity to meet user demand. Additionally, user devices employing duplicate Walsh code sequence assignments at a base station serving the sector can be distinguished from each other, and timing offsets between such users can be enforced to mitigate any jamming effect at the base station receiver. Still furthermore, user device channel requirements in the sector can be continuously evaluated and an appropriate number of antennas can be dynamically deployed to provide scalable service to all such user devices.

39 Claims, 10 Drawing Sheets

U.S. PATENT DOCUMENTS

| | | | |
|---|---|---|---|
| 6,374,122 B1 | 4/2002 | Leung | |
| 6,388,998 B1 | 5/2002 | Kasturia | |
| 6,396,822 B1 | 5/2002 | Sun et al. | |
| 6,519,277 B2 | 2/2003 | Eidson | |
| 6,741,550 B1 | 5/2004 | Shin | |
| 6,845,238 B1 | 1/2005 | Muller | |
| 6,965,633 B2 | 11/2005 | Sun et al. | |
| 6,973,062 B1 | 12/2005 | Han | |
| 6,980,527 B1* | 12/2005 | Liu et al. | 370/280 |
| 6,996,056 B2 | 2/2006 | Chheda et al. | |
| 7,099,372 B2 | 8/2006 | Nieczyporowicz et al. | |
| 7,123,579 B1 | 10/2006 | Lyu | |
| 7,239,847 B2 | 7/2007 | Attar et al. | |
| 7,272,110 B2 | 9/2007 | Lee et al. | |
| 7,280,467 B2 | 10/2007 | Smee et al. | |
| 7,324,429 B2* | 1/2008 | Walton et al. | 370/203 |
| 7,391,755 B2 | 6/2008 | Gopalakrishnan et al. | |
| 7,411,899 B2 | 8/2008 | Kavak et al. | |
| 7,650,154 B2 | 1/2010 | Pedersen et al. | |
| 7,925,225 B2* | 4/2011 | Wu et al. | 455/102 |
| 2002/0018520 A1 | 2/2002 | Eidson | |
| 2002/0067759 A1* | 6/2002 | Ertel et al. | 375/141 |
| 2002/0097703 A1* | 7/2002 | Nieczyporowicz et al. | 370/342 |
| 2002/0197997 A1 | 12/2002 | Attar et al. | |
| 2003/0031119 A1 | 2/2003 | Kim et al. | |
| 2003/0202563 A1 | 10/2003 | Das et al. | |
| 2004/0037238 A1* | 2/2004 | Schiff et al. | 370/321 |
| 2004/0062221 A1* | 4/2004 | Gopalakrishnan et al. | 370/335 |
| 2004/0071115 A1 | 4/2004 | Earnshaw et al. | |
| 2004/0146093 A1* | 7/2004 | Olson et al. | 375/148 |
| 2004/0179544 A1* | 9/2004 | Wilson et al. | 370/442 |
| 2004/0184570 A1* | 9/2004 | Thomas et al. | 375/346 |
| 2004/0252665 A1 | 12/2004 | Clark et al. | |
| 2004/0257975 A1* | 12/2004 | Proctor, Jr. | 370/203 |
| 2005/0105485 A1* | 5/2005 | Cleveland | 370/320 |
| 2005/0111408 A1 | 5/2005 | Skillermark et al. | |
| 2005/0111599 A1* | 5/2005 | Walton et al. | 375/347 |
| 2005/0128985 A1* | 6/2005 | Liberti et al. | 370/335 |
| 2005/0226267 A1 | 10/2005 | Pedersen et al. | |
| 2005/0226414 A1 | 10/2005 | Lee et al. | |
| 2006/0013250 A1* | 1/2006 | Howard et al. | 370/465 |
| 2006/0045170 A1 | 3/2006 | van Rensburg et al. | |
| 2007/0019535 A1* | 1/2007 | Sambhwani et al. | 370/203 |
| 2007/0249355 A1 | 10/2007 | Kang et al. | |
| 2007/0270155 A1 | 11/2007 | Nelson, Jr. et al. | |
| 2008/0069015 A1* | 3/2008 | Walton et al. | 370/280 |
| 2008/0280611 A1 | 11/2008 | Miklos et al. | |

FOREIGN PATENT DOCUMENTS

| | | |
|---|---|---|
| CN | 1378357 A | 11/2002 |
| EP | 1396956 | 3/2004 |
| EP | 0957604 | 11/2005 |
| GB | 2378857 | 2/2003 |
| JP | 2002515203 T | 5/2002 |
| JP | 2003134550 | 5/2003 |
| JP | 2004248315 A | 9/2004 |
| JP | 2005110130 A | 4/2005 |
| JP | 2007512773 T | 5/2007 |
| KR | 1020040010782 | 1/2004 |
| WO | WO9737456 A2 | 10/1997 |
| WO | 00/74255 | 12/2000 |
| WO | 0120942 | 3/2001 |
| WO | 0122607 A2 | 3/2001 |
| WO | WO0172081 | 9/2001 |
| WO | 0203561 | 1/2002 |
| WO | 02056517 A1 | 7/2002 |
| WO | 03081930 | 10/2003 |
| WO | 2004010573 A1 | 1/2004 |
| WO | WO2005053186 A1 | 6/2005 |

OTHER PUBLICATIONS

International Search Report—PCT/US06/028730—International Search Authority, European Patent Office—Nov. 24, 2006.

Written Opinion—PCT/US06/028730—International Search Authority, European Patent Office—Nov. 24, 2006.

International Preliminary Report on Patentability—PCT/US06/028730—The International Bureau of WIPO, Geneva, Switzerland—Jan. 22, 2008.

"Universal Mobile Telecommunications System (UMTS)," ETSI Standards, European Telecommunications Standards Institute, 3GPP TS 25.331 Version 6.5.0 Release 6, vol. 3-R2, No. V650, Mar. 2005.

International Search Report-PCT/US2006/042061-International Search Authority-European Patent Office-May 2, 2007.

Written Opinion-PCT/US2006/042061-International Search Authority-European Patent Office-May 2, 2007.

International Preliminary Report on Patentability-PCT/US2006/042061-International Search Authority-International Search Authority-The International Bureau of WIPO-Apr. 29, 2008.

"cdma2000 High Rate Packet Data Air Interface Specification." TIA IS-856, V.2, Oct. 27, 2000.

"Spreading and Modulation (TDD)", 3GPP TS 25.223, V.6.0.0 (Dec. 2003).

Monogioudis, P. et al. "Intelligent Antenna Solutions for UMTS: Algorithms and Simulation Results." IEEE Communications Magazine, IEEE Service Center, New York, NY, US, vol. 42, No. 10, Oct. 2004, Pp. 28-39.

Taiwan Search Report—TW095139877—Oct. 31, 2009.

Tango GG., "statistical multiplexing", http://www.moon-soft.com/program/bbs/readelite27918.htm, Apr. 3, 2001.

Translation of Office Action in Chinese application 200680040317.1 corresponding to U.S. Appl. No. 11/365,360, citing CN1378357 dated Mar. 21, 2011.

Translation of Office Action in Japanese application 2008-538012 corresponding to U.S. Appl. No. 11/365,218, citing US20020067759, US20050105485, US20020097703, WO2005053186, JP2007512773 and JP2002515203 dated Jan. 25, 2011.

\* cited by examiner

QUASI-ORTHOGONAL ALLOCATION OF CODES IN TD-CDMA SYSTEMS

CLAIM OF PRIORITY UNDER 35 U.S.C. §119

The present Application for Patent claims priority to Provisional Application No. 60/731,023 entitled "QUASI-ORTHOGONAL ALLOCATION OF CODES IN TD-CDMA SYSTEMS" filed Oct. 27, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"VARYING SCRAMBLING/OVSF CODES WITHIN A TD-CDMA SLOT TO OVERCOME JAMMING EFFECT BY A DOMINANT INTERFERER" having Ser. No. 11/553,973, filed concurrently herewith, assigned to the assignee hereof, and expressly incorporated by reference herein; and "FAST CELL SELECTIN IN TD-CDMA (UMTS TDD)" having Ser. No. 11/365,360, filed concurrently herewith, assigned to the assignee hereof, and expressly incorporated by reference herein.

BACKGROUND

I. Field

The following description relates generally to wireless communications, and more particularly to increasing transmission capacity in a CDMA communication environment using Walsh codes and multiple receive antennas.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Conventional network transmission protocols are susceptible to scheduling limitations and transmission capacity limits, resulting in diminished network throughput. Thus, there exists a need in the art for a system and/or methodology of improving throughput in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with increasing sector throughput in a wireless communication environment. According to one aspect, multiple users communicating on a reverse link in a sector can be allocated duplicate Walsh sequences (e.g., codes). Different users assigned the same Walsh code can excite different spatial signatures over multiple receive antennas at a base station serving the sector. Such users can be separated even though they employ the same Walsh code by receiver techniques such as a matched filter, a minimum mean-squared error technique, a successive cancellation technique, etc. In the event that users employing duplicate Walsh codes have similar spatial techniques, code hopping and/or timing offsets can be enforced between such users to mitigate a potential jamming effect at the base station serving the sector. In this manner, rather than increasing bandwidth to address code limitations, Walsh code space can be reused to allocate additional codes in a time slot.

According to a related aspect, a method of increasing communication throughput in a code-division multiple access wireless communication environment can comprise assigning a set of orthogonal Walsh code sequences to a first group of users in a network sector, assigning a duplicate set of orthogonal Walsh code sequences to at least a second set of users in the sector, and deploying a number of receive antennas equal to the number of sets of orthogonal Walsh code sequences assigned to scale system capacity upward. Additionally, the method can comprise distinguishing user devices employing duplicate Walsh code sequence assignments at a base station serving the sector, and enforcing timing offsets between such users to mitigate any jamming effect at the base station receiver. Still further more, the method can comprise assessing a user device channel requirements in the sector and deploying an appropriate number of antennas to provide service to all such user devices.

Another aspect relates to a wireless communication apparatus, comprising a memory that stores information related duplicate sets of orthogonal Walsh codes assigned to user devices in a sector of a wireless network, and a processor coupled to the memory that deploys at least two antennas to at least double an amount of code space in the sector. The apparatus can further comprise a Walsh code generator that generates a first set of orthogonal Walsh codes and at least a second, duplicate set of orthogonal Walsh codes. The apparatus can still further comprise a hopping component that enforces timing offsets between user devices with duplicate Walsh code assignments to mitigate jamming at a base station receiving duplicate Walsh code transmissions from multiple user devices, and a receiver that distinguishes user devices with duplicate Walsh code assignments from each other to permit timing offsets there between to be enforced. The receiver can employ one or more of a matched filter receiver, a minimum mean-squared error technique, and a successive cancellation technique to distinguish duplicately assigned user devices from each other.

Yet another aspect relates to a wireless communication apparatus, comprising means for generating duplicate sets of orthogonal Walsh codes, means for assigning a first set of orthogonal Walsh codes to user devices in a network sector, means for assigning assigns at least a second, duplicate set of orthogonal Walsh codes to users in the sector, and means for deploying a number of receive antennas equal to the number of sets of orthogonal Walsh codes assigned. The apparatus can further comprise means distinguishing user devices with duplicate Walsh code assignments from each other, and means for enforcing timing offsets between such user devices.

Still another aspect relates to a computer-readable medium having stored thereon computer-executable instructions for assigning a set of orthogonal Walsh code sequences to a first group of users in a time-division CDMA network sector, assigning at least one duplicate set of orthogonal Walsh code sequences to at least a second set of users in the sector, and deploying a number of receive antennas equal to a number of sets of orthogonal Walsh code sequences to be assigned. The computer-readable medium can further comprise instructions for distinguishing user devices employing duplicate Walsh code sequence assignments, at a base station serving the sector, and for enforcing timing offsets between user devices employing duplicate Walsh code sequences to reduce a potential jamming effect at a base station receiving communication signals from the user devices.

A further aspect provides for a processor that executes instructions for increasing throughput in a wireless communication environment, the instructions comprising, assigning a set of orthogonal Walsh code sequences to a first group of users in a time-division duplexed CDMA network sector, assigning at least one duplicate set of orthogonal Walsh code sequences to at least a second set of users in the sector, deploying a receive antenna for each set of orthogonal Walsh code sequences such that the number of receive antennas in the sector is equal to the number of code sets to be assigned, and distinguishing user devices employing duplicate Walsh code sequence assignments and enforcing timing offsets there between, at a base station serving the sector.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 7 is an illustration of a lookup table that can be generated, dynamically updated, and/or stored, in either or both of a user device and a base station, and which comprises information related to Walsh code sequences, antenna deployment, user device assignments, and the like.

DETAILED DESCRIPTION

Figure 1:
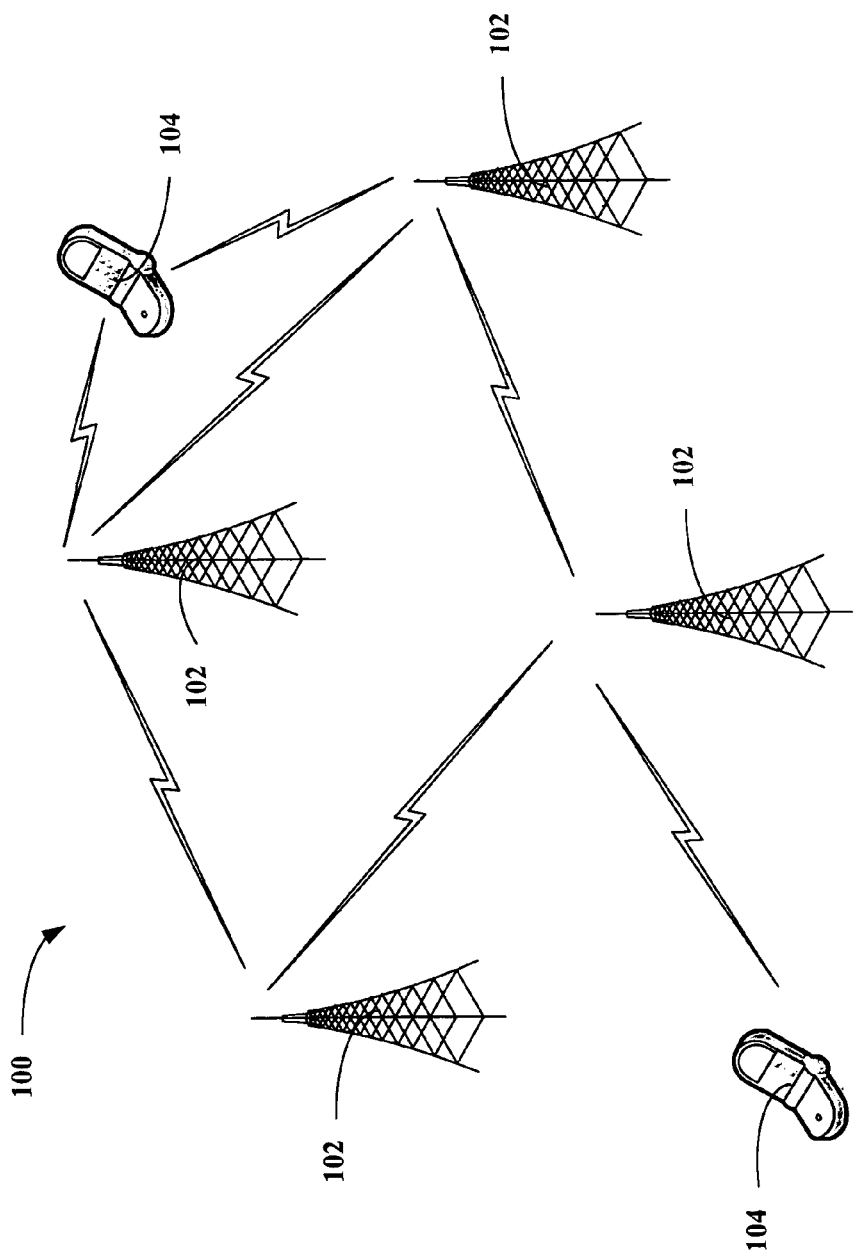
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to FIG. 1, a wireless network communication system 100 is illustrated in accordance with various embodiments presented herein. Network 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100.

WCDMA is a communication technique that employs Walsh codes, also known as orthogonal variable spreading factor (OVSF) codes, to encode a communication channel in both the forward link (FL) and the reverse link (RL). A Walsh code is an orthogonal code that facilitates uniquely identifying individual communication channels, as will be appreciated by one skilled in the art. A signal encoded using a Walsh code is typically interpreted as noise by a receiver that does not employ the same Walsh code to decode the signal. Utilization of Walsh codes can limit system dimensions and can limit transmission capabilities when multiple antennas are employed at a base-station for transmit/receive actions. To overcome such limitations associated with conventional systems, space division multiple access (SDMA) can be employed on the forward link (FL) and reverse link (RL) in a WCDMA communication environment. Such techniques are applicable to FL and RL in time division duplex (TDD) and frequency division duplex (FDD) WCDMA environments.

The FL and RL in conventional WCDMA systems utilize Walsh code multiplexing where multiple users are allocated different codes and scheduled simultaneously. In the case of FL, a base station allocates one or more Walsh codes to each user device and transmits simultaneously to the scheduled user devices. In the case of RL, users within a sector are allocated different Walsh codes and are received simultaneously (e.g., using a MAC channel) at the base-station. User devices can be separated at the base station using standard despreading-decoding techniques for CDMA. The number of codes that can be assigned simultaneously is limited by the length of the Walsh code. For example, if the Walsh code is of length N chips, then at a given time up to N codes may be assigned to multiple user devices. This imposes a fundamental constraint on the number of codes that may be assigned simultaneously (e.g., a dimension limit). The FL and RL in a typical WCDMA-TDD environment allow Walsh codes of a length of up to 16 chips. Thus, up to 16 user devices can be supported simultaneously in any given slot. This conventional dimension limitation can be detrimental when the base station has multiple receive antennas.

A CDMA system is usually designed to operate in a linear region, such that a capacity-post despreading SINR relationship is linear. For example, if the system is operating in the linear region and if the post despreading SINR increases by 3 dB (e.g., doubles) then the capacity (throughput) of the system also doubles. Increasing the number of receive antennas increases post despreading SINR. Therefore, provided the system operates in the linear region, the capacity of the system can be scaled linearly with the number of receive antennas. However, when multiple receive antennas are employed, the receive antenna array and diversity gain in post despreading SINR tends to push the system out of the linear region. One way to force the system to remain in the linear region is to increase interference, which can be accomplished by increasing the number of codes supported simultaneously. For example, if the number of receive antennas is doubled, a CDMA system employing pseudo random codes can simply double the number of codes (reducing the transmit power per code by half, in this case, for inter-sector interference control). The reduction in transmit power can be compensated for by the SINR gain associated with the multiple receive antennas. In this manner, linear scaling with regard to the number of receive antennas in a CDMA system can be achieved. However, in a conventional WCDMA-TDD system with a limited number of codes (e.g., 16), increasing the number of receive antennas can eventually and undesirably push the system out of the linear region, thereby detrimentally affecting system capacity improvement.

Figure 2:
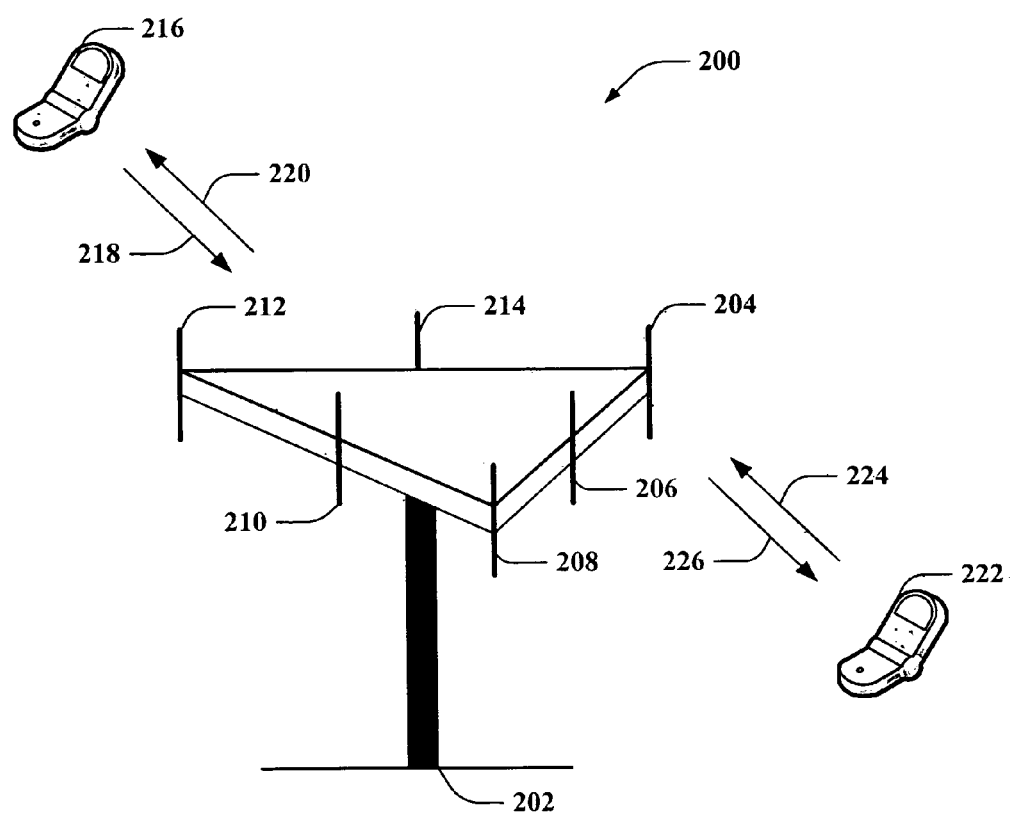
FIG. 2 is an illustration of a multiple access wireless communication system according to one or more embodiments.

Referring now to FIG. 2, a multiple access wireless communication system 200 according to one or more embodiments is illustrated. A 3-sector base station 202 includes multiple antenna groups: one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 206 and 208, where antennas 206 and 208 transmit information to mobile device 222 over forward link 226 and receive information from mobile device 222 over reverse link 224.

Each group of antennas and/or the area in which they are designated to communicate is often referred to as a sector of base station 202. In one embodiment, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

Referring to FIGS. 3-6, methodologies relating to generating supplemental system resource assignments are illustrated. For example, methodologies can relate to providing duplicate Walsh code sets and associated antennas in an FDMA environment, an OFDMA environment, a CDMA environment, a WCDMA environment, a TDMA environment, an SDMA environment, or any other suitable wireless environment. Specifically, methodologies set forth herein are described with regard to a wide-band code-division multiple access (WCDMA) wireless communication environment, although other types of communication environments can be utilized in conjunction with the described aspects. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 3:
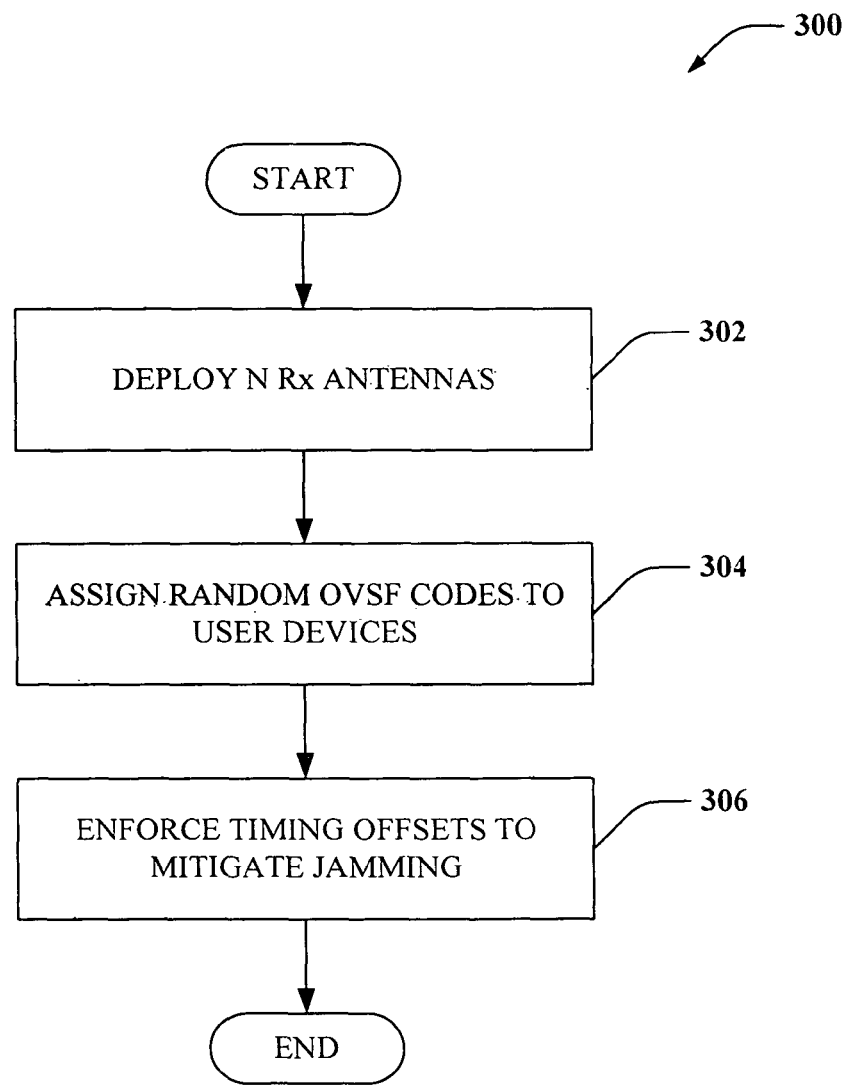
FIG. 3 illustrates a methodology for improving network throughput in a wireless communication environment, in accordance with one or more aspects presented herein.

Referring now to FIG. 3, a methodology 300 for improving network throughput in a wireless communication environment is illustrated, in accordance with one or more aspects presented herein. As noted above, a fundamental drawback of using a conventional WCDMA-TDD system is the dimension limit due to a limited number of codes that can be assigned to users. In order to combat this drawback, multiple antennas can be deployed to permit a plurality of code sets to be distributed and/or assigned to user devices.

According to this aspect, a plurality of Rx antennas can be deployed at 302. For instance, four Rx antennas can be deployed in order to permit a total of 64 Walsh codes (e.g., four duplicate sets of 16 codes) to be distributed to user devices in a sector of a wireless communication environment. It will be appreciated that more or fewer antennas can be allocated depending on system requirements and/or user device numbers, etc. At 304, random Walsh codes can be assigned to user devices until all user devices in the sector have been assigned one or more Walsh codes via which to communicate. At 306, timing offsets can be defined and/or enforced to reduce interference between any user devices that may have been assigned duplicate Walsh code sequences. In this manner, multiple code sets can be defined and allocated to scale system capacity to meet user needs.

Although the foregoing describes RL communication in a WCDMA-TDD environment, the techniques apply equally well to RL communication in a WCDMA-FDD environment. Additionally, during FL communication, transmit beam-forming provides an opportunity for a linear scaling of system capacity with the number of transmit antennas. Thus, the concepts of supporting larger number of users through appropriate scheduling/code space enhancement are applicable in FL communication as well. Additionally, it will be appreciated by those skilled in the art that other types of codes (e.g., shifted Walsh codes, pseudo-orthogonal codes, or some other type of codes) can be employed by the systems and methods herein, and that such are not limited solely to Walsh codes per se.

Figure 4:
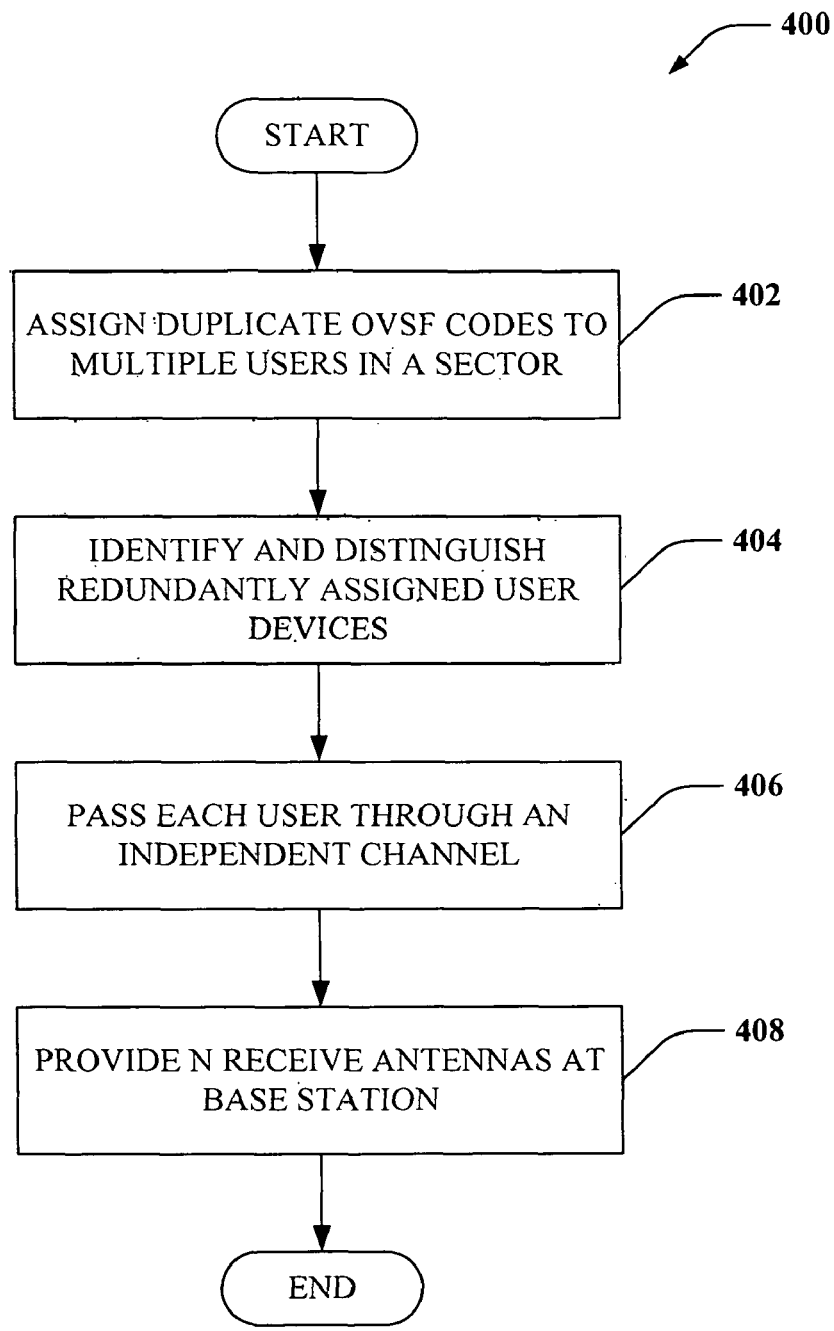
FIG. 4 is an illustration of a methodology for improving throughput in a wireless communication environment by deploying multiple receive antennas to meet sector needs, in accordance with various embodiments described herein.

FIG. 4 illustrates a methodology 400 for improving communication throughput in a wireless communication environment by deploying multiple receive antennas to meet sector needs, in accordance with various embodiments described herein. At 402, duplicate Walsh codes (OVSF codes) can be assigned to multiple users in a wireless communication sector, such as a sector of a network employing a WCDMA communication protocol. Multiple users devices corresponding to the same Walsh code sequence can excite different spatial signatures (e.g., channels) over the multiple receive antennas at a base station serving the sector. Although such user devices employ the same Walsh code sequence, they can be identified and distinguished from one another at 404. For example, identification can be performed using a matched filter (e.g., a Rake receiver, . . . ), a minimum mean-squared error (MMSE) protocol-based receiver, a successive interference cancellation technique, or any other suitable protocol for uniquely identifying user devices communicating in the same sector via the same Walsh code, as will be appreciated by one skilled in the art.

In the event that two or more user devices assigned the same Walsh code have similar spatial signatures (e.g., and therefore might interfere with each other) each user device can be passed through an independent channel at 406. Independent channels can be provided by independent Rx antennas, which are provided at 408 to meet capacity requirements. For instance, in a case where 40 user devices are attempting to communicate with a base station in a single sector at a given time, three Rx antennas can be deployed to meet system capacity requirements. According to this example, each Rx antenna can provide 16 independent channels based at least in part on the 16 Walsh codes allocated thereto, over which 16 user devices can communicate. Thus, a total of 48 channels are present to more than accommodate the 40 user devices requiring service. Moreover, the three Rx antennas can be employed to distinguish spatial signatures of user devices employing duplicate Walsh codes. It will be appreciated by one skilled in the art that the foregoing example is not limited to a case in which three antennas are deployed, but rather that any number antennas can be deployed to facilitate meeting system demands and to scale the system capacity to the number of users requiring Walsh code assignments.

Figure 5:
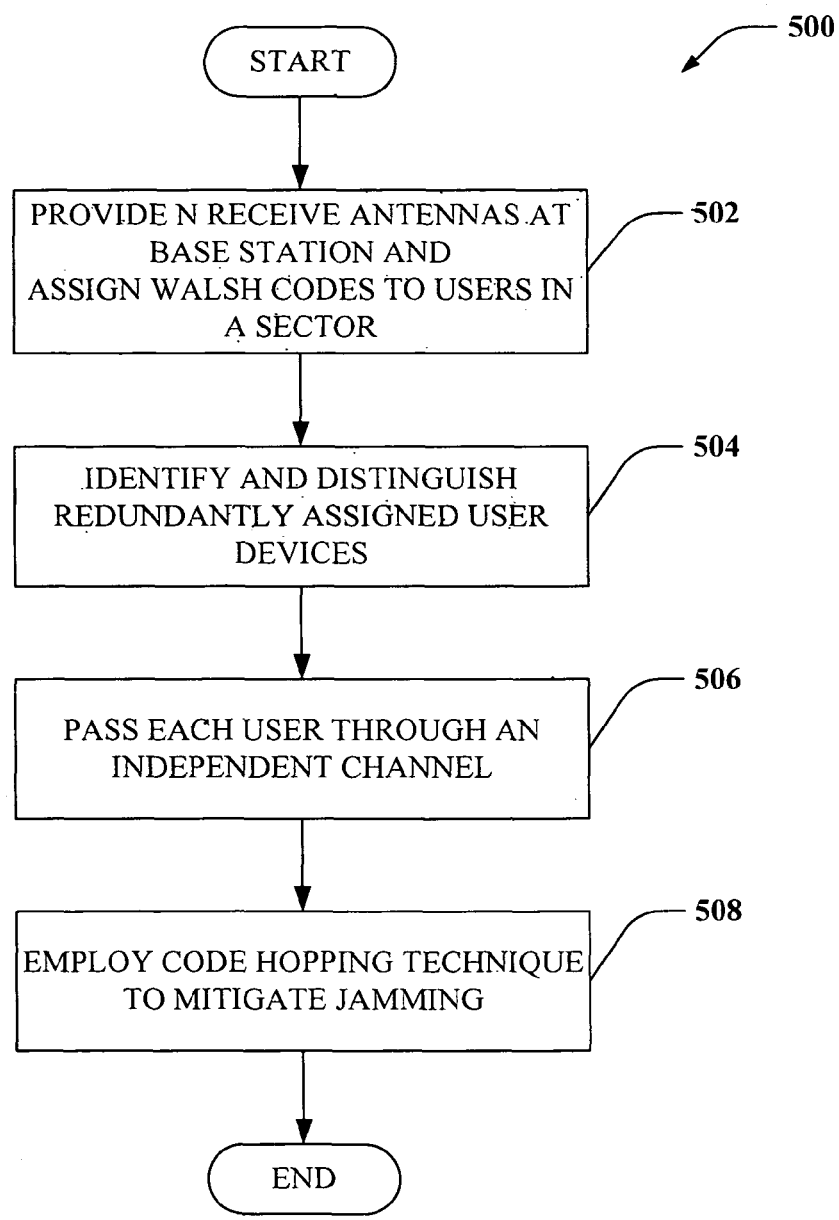
FIG. 5 is an illustration of a methodology for increasing system capacity linearly with respect to a number of receive antennas, in accordance with one or more aspects set forth herein.

FIG. 5 is an illustration of a methodology 500 for increasing system capacity linearly with respect to a number of receive antennas, in accordance with one or more aspects set forth herein. For example, if a given Walsh code has a length of N chips, which permits N codes to be assigned, then N users can be supported in a case where each user is assigned a single code. In a conventional WCDMA communication environment employing such Walsh codes, this limit is typically 16. Thus, a Walsh code length of 16 chips is described herein to facilitate understanding of various aspects. However, it is to be appreciated that longer or shorter Walsh codes having more or fewer chips (e.g., 8, 32, 64, etc.) can be employed, such that the number of users that can be supported by a single Walsh code is limited only by the length of the Walsh code.

With regard to the spatial signatures of individual users, users whose geographical locations are in close enough proximity to one another to suggest a high probability of interference there between can be assigned orthogonal Walsh sequences within a single code set, at 502. Users whose spatial signatures indicate that they are sufficiently displaced from each other can be assigned identical Walsh sequences, at 504. Users with duplicate code assignments can be identified and/or distinguished using, for instance, a Rake receiver, an MMSE-based receiver, a successive interference cancellation technique, or the like, as will be understood by one skilled in the art. By receiving signals from user devices with duplicate Walsh code assignments at all receivers deployed in the sector, such signals can be separated out and/or distinguished from each other, despite the duplicate code assignments, based at least in part on the spatial signatures detected across all deployed antennas.

At 506, each user can be passed through an independent channel to mitigate interference between user devices. For instance, in a scenario where 52 users require communication support (e.g., Walsh sequence assignments), a minimum of four receive antennas can be allocated for communication in the sector, cell, etc., to linearly scale the sector's capacity by permitting up to four duplicate sets of codes comprising duplicate orthogonal code sequences to be assigned. Thus, 64 channels can be provided to scale system capacity up to a level that is sufficient to meet sector requirements. At 508, code hopping can be performed to mitigate any jamming effect that might be introduced by multiple Walsh code assignments when duplicate transmissions are received at a base station serving the sector. While the foregoing example is described with regard to Walsh codes, it will be understood that shifted Walsh codes, pseudo-orthogonal codes, and the like can also be employed in conjunction with the systems and methods described herein.

It will be appreciated that, in accordance with one or more embodiments described herein, inferences can be made regarding system scaling, code sequence allocation, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding a number of receive antennas to allocate to a particular sector based at least in part on geographic proximity of users in the sector. According to this example, it can be determined that 42 users require Walsh code sequence assignments to permit communication. If system capacity is limited to 16 codes (e.g., Walsh codes, shifted Walsh codes, pseudo-orthogonal codes, etc.) per code set, then three antennas can be deployed linearly scale system capacity to provide 48 assignable code sequences to meet system demand. In such a case, however, it may be determined that subsets of the 42 users have sufficiently disparate spatial signatures to warrant employing an extra antenna. For example, if four groups of users are geographically isolated from each other but users within each group are geographically close enough to each other to require orthogonal Walsh sequences, then an inference can be made that users within each of the four groups should be assigned to a same code set. In this example, four receive antennas can be deployed to scale the system upward (e.g., four 16-code sets can be generated to provide a total of 64 available Walsh codes). In this manner, extra code sequences can be made available to each group in the event that one or more additional users join the group, a particular user in the group requires more than a single Walsh code sequence, etc. Additionally, such inferences can be made with regard to communication during FL communication by allocating multiple transmit antennas, using beam-forming techniques, etc.

According to another example, inferences can be made relating to a minimum number of antennas to employ during various times of the day, week, etc., such as peak hours and the like, scale system capacity upward in anticipation of increased data traffic, etc. It will be appreciated that the foregoing examples are illustrative in nature and are not intended to limit the number of inferences that can be made or the manner in which such inferences are made in conjunction with the various embodiments and/or methods described herein.

Figure 6:
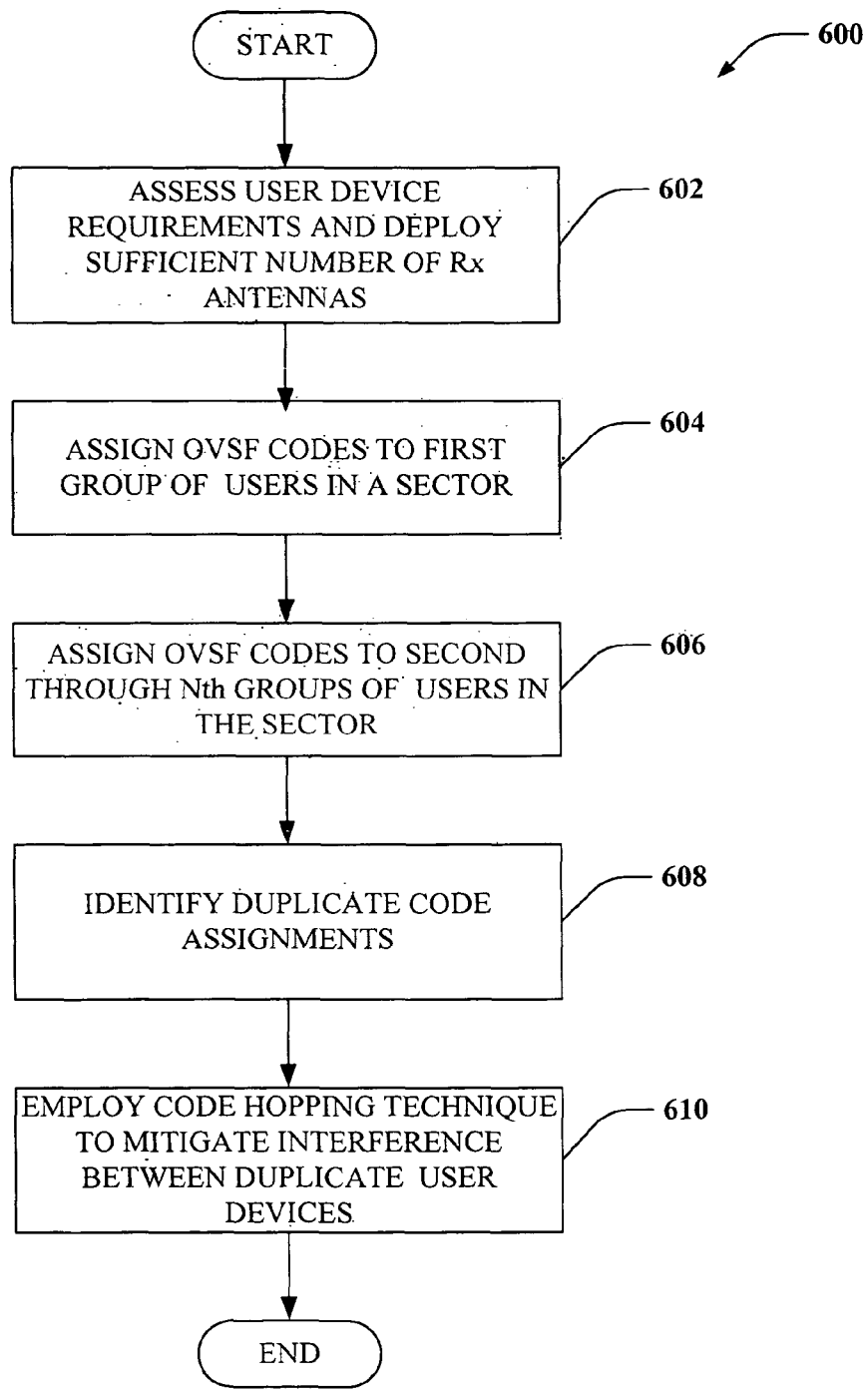
FIG. 6 illustrates a methodology that facilitates scaling system capacity to meet user demand, in accordance with one or more aspects.

FIG. 6 is an illustration of a methodology 600 that facilitates scaling system capacity to meet user demand, in accordance with one or more aspects. At 602, system demand in a sector can be evaluated and a sufficient number of Rx antennas can be deployed to meet system demand. For instance, a number of users in the sector can be divided by a number of available Walsh code sequences in a set, such as 16, and the quotient can be rounded upward to a nearest whole number, which indicates a minimum number of antennas to deploy for the sector, and thus a minimum number of code sets that can be supported. At 604, orthogonal Walsh codes can be assigned to a first group of user devices. For example, in a scenario where 16 Walsh code sequences are available in a set, all 16 available code sequences can be assigned to a first set of users. At 606, orthogonal Walsh codes can be assigned to a second through an Nth group of user devices. Thus, an entire first set of Walsh codes is assigned at 604 before any duplicate codes are assigned at 606. This assignment scheme minimizes any undesirable potential for interference between duplicately assigned Walsh codes being employed by different user devices.

At 608, duplicate code assignments to plural user devices can be identified to facilitate determining whether code hopping or some other technique is desirable to mitigate interference. If desired, such as in a case where a plurality of devices employ identical Walsh code sequences, code hopping can be performed at 610 to ensure that multiple transmissions using the same Walsh code are offset in time to further mitigate interference and/or jamming at a receiver in a base station serving the sector.

Figure 7:
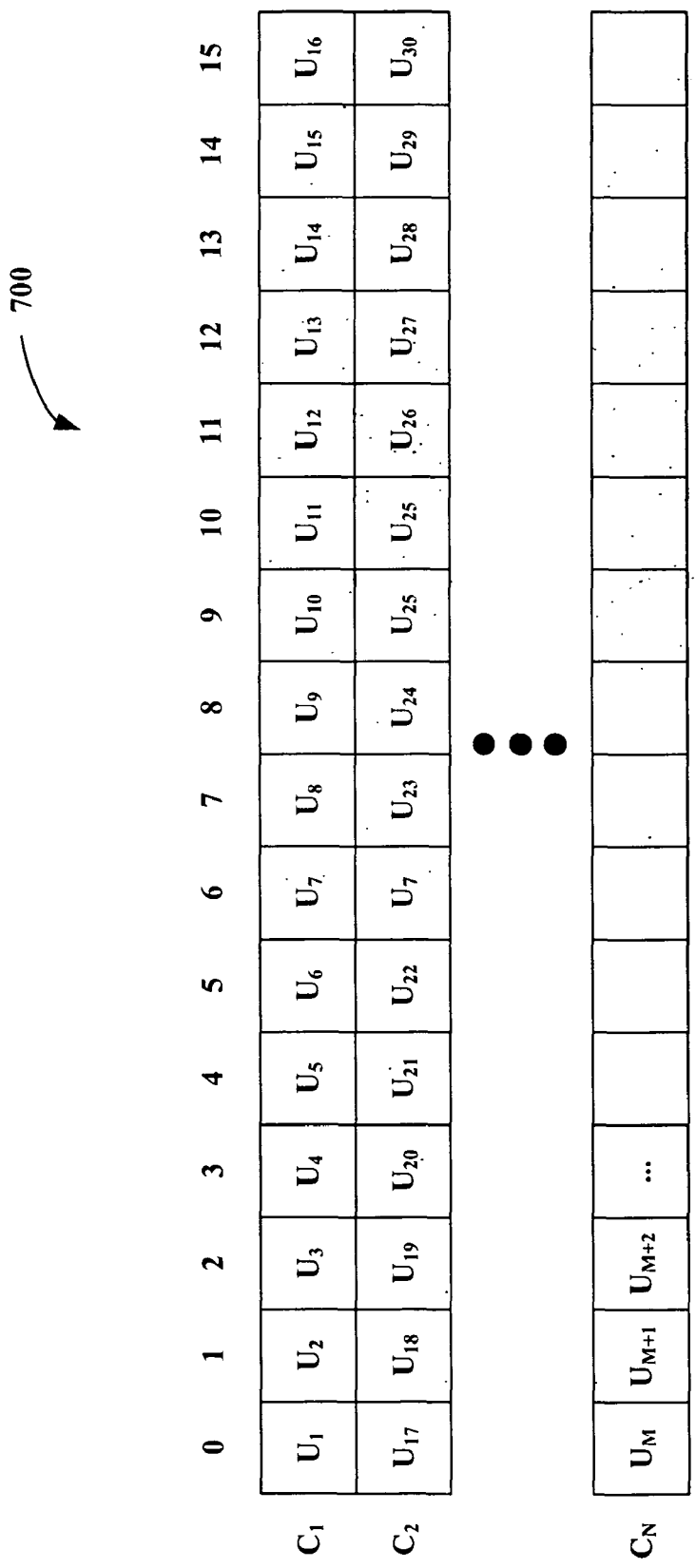

FIG. 7 illustrates a lookup table 700 that can be generated, dynamically updated, and/or stored, in either or both of a user device and a base station, and which comprises information related to Walsh code sequences, antenna deployment, user device assignments, and the like. According to the figure, a plurality of code sets, $C_1$-$C_N$, are provided, each of which can comprise 16 Walsh code sequences, labeled 0-15, which can be assigned to user devices and by which such user devices can communicate with N corresponding receive antennas at a base station, where the number N of receive antennas is equal to the number of code sets in order to linearly scale system capacity to meet user needs. User devices $U_1$-$U_{16}$ have been assigned the orthogonal Walsh sequences associated with code set $C_1$. It is to be noted that the numbering of the user devices in FIG. 7 is provided to illustrate that each user device is distinct. However, it will be appreciated that user devices can be randomly assigned, assigned based at least in part on spatial signatures associated therewith, and/or according to any other suitable scheme, as will be appreciated by one skilled in the art.

It will further be noted that $U_{25}$ is assigned a pair of Walsh sequences, sequences 9 and 10, in code set $C_2$. Such assignment can be made where a user device requires more than a single Walsh sequence to communicate with the designated receive antenna, and/or because the spatial signature for $U_{25}$ is sufficiently different from that of $U_{10}$ and $U_{11}$, as well as from that of any other user devices communicating using the same Walsh codes. Moreover, code hopping can be performed for user devices employing identical and/or duplicate Walsh codes to mitigate a potential jamming effect at a base station receiver.

It will further be noted that $U_7$ has also been assigned a pair of Walsh codes in a manner similar to the assignment of multiple Walsh codes to $U_{25}$. However, the pair of Walsh codes assigned to $U_7$ are identical, such that $U_7$ employs the same code for communication within two different code sets, $C_1$ and $C_2$. This assignment scheme even further mitigates potential for interference since, by assigning the same Walsh code over two code sets to a single device, the number of devices employing identical Walsh codes in a sector is minimized. This in turn reduces a number of devices that require code hopping or the like, further simplifying scaling system capacity to sector transmission requirements.

Additionally, it is to be understood that user device transmissions can be received by all receive antennas deployed in the sector, such that, for instance, $U_1$, $U_{17}$, and $U_M$ can employ the same Walsh code in each of duplicate code sets $C_1$, $C_2$ and $C_N$, respectively, but can be received by all receive antennas. Spatial signatures for each of user devices $U_1$, $U_{17}$, and $U_M$ will be different as perceived by each receive antenna, and aggregate information related to each user device's spatial signature as perceived by the individual receive antennas can be utilized to distinguish $U_1$, $U_{17}$, and $U_M$ from one another. In this manner, spatial signatures of users in the sector can be jointly processed based on received signals from all receive antennas at the receiver. Such can further be facilitate by employing, for example, a matched filter (RAKE) receiver, an MMSE protocol, successive cancellation, or the like, as will be understood by those skilled in the art. Moreover, although the foregoing has been described with regard to Walsh codes, other suitable codes (e.g., shifted Walsh, pseudo-orthogonal codes, etc.) can be employed in conjunction with the various embodiments described herein.

Figure 8:
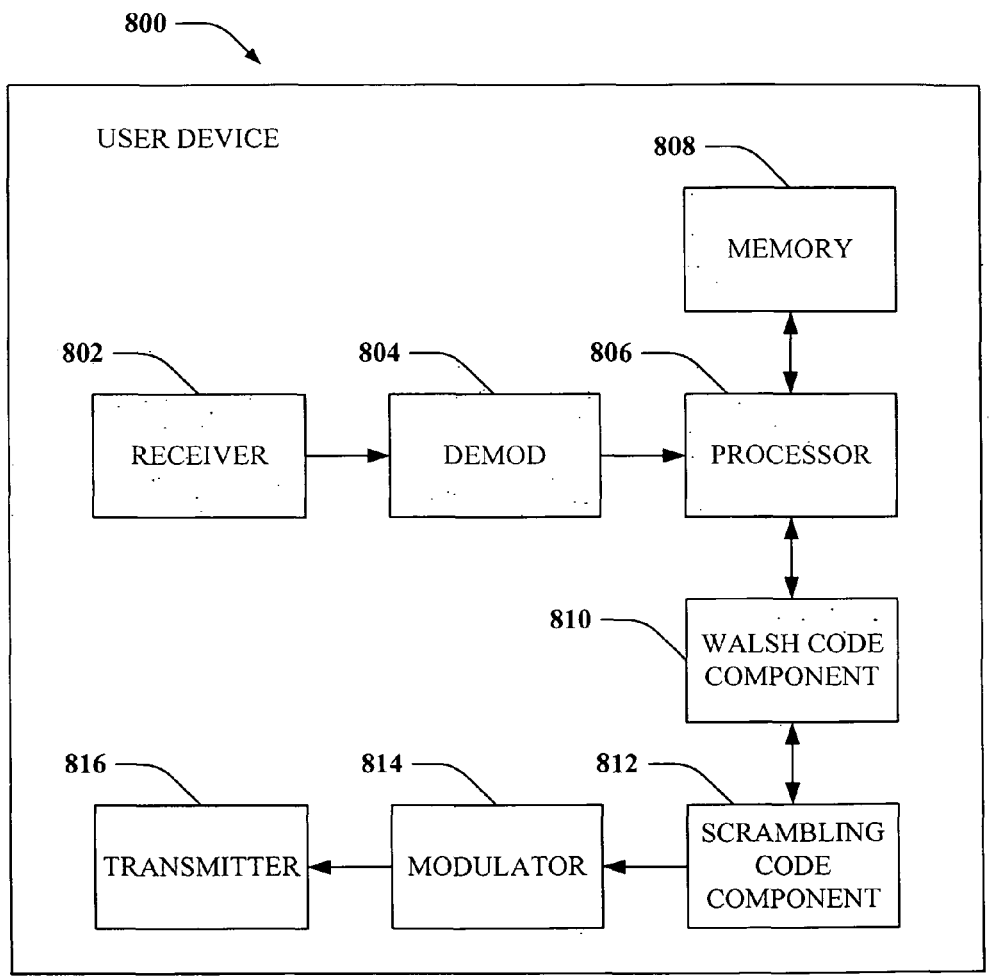
FIG. 8 is an illustration of a system that facilitates increasing code space in a wireless communication environment to increase system capacity limits in accordance with one or more embodiments set forth herein.

FIG. 8 is an illustration of a system 800 that facilitates increasing code space in a wireless communication environment to increase system capacity limits in accordance with one or more embodiments set forth herein. System 800 can reside in a base station and/or in a user device, as will be appreciated by one skilled in the art. System 800 comprises a receiver 802 that receives a signal and from, for instance a receive antenna, and performs typical actions thereon (e.g., filters, amplifies, downconverts, etc.) the received signal and digitizes the conditioned signal to obtain samples. A demodulator 804 can demodulate and provide received pilot symbols to a processor 806 for channel estimation.

Processor 806 can be a processor dedicated to analyzing information received by receiver component 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to Walsh assignments, Walsh code sequences, lookup tables comprising information related thereto, and any other suitable information related to scaling system capacity linearly with regard to a number of employed receive antennas as described herein. Memory 808 can additionally store protocols associated with generating lookup tables, modulating symbols with Walsh codes, scrambling codes, etc., such that user device 800 can employ stored protocols and/or algorithms to achieve increasing code space in a network sector as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 is further coupled to a Walsh code component 810 that can generate Walsh code sequence(s) and append such to a communication signal that can be received by a number of receive antennas deployed in a sector. Because Walsh codes can be duplicately assigned in conjunction with one or more methods described herein to increase code space in a network sector, a scrambling code component 812 can be operatively associated with Walsh code component 810, which can append a scrambling code unique to the code set to which user device 800 is assigned (if desired). The scrambling code can be employed by a base station processor and associated hardware/software to identify user device 800 as belonging to the code set, and the Walsh code sequence appended to the signal transmitted by user device 800 can identify user device 800 to the base station as a specific device in the group of devices associated with the specific code set. User device 800 still further comprises a symbol modulator 814 and a transmitter that transmits the modulated signal with the Walsh code and, if desired, the scrambling code identifier.

Figure 9:
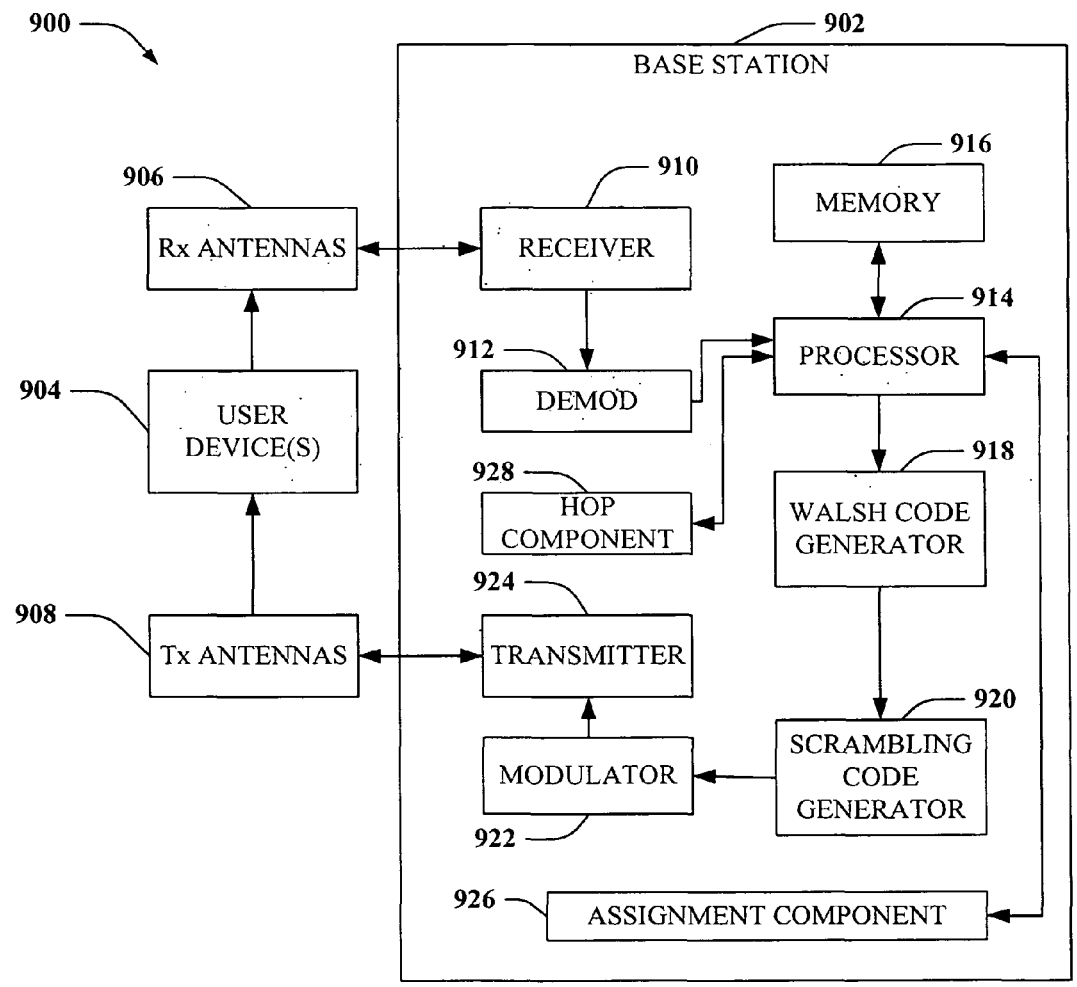
FIG. 9 is an illustration of a system that facilitates increasing system capacity in a WCDMA communication environment in accordance with various aspects.

FIG. 9 is an illustration of a system 900 that facilitates increasing system capacity in a WCDMA communication environment in accordance with various aspects. System 900 comprises a base station 902 with a receiver 910 that receives signal(s) from one or more user devices 904 via a plurality of receive antennas 906, and transmits to the one or more user devices 904 through a transmit antenna 908. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. Demodulated symbols are analyzed by a processor 914 that is similar to the processor described above with regard to FIG. 8, and is coupled to a memory 916 that stores information related to code set assignments, user device assignments, lookup tables related thereto, unique scrambling sequences, and the like. Receiver output for each antenna can be jointly processed by receiver 910 and/or processor 914. Processor 914 is further coupled to a Walsh code generator 918 that generates code sequences that can be appended to a signal to uniquely identify an intended user device. Base station 902 further comprises a scrambling code generator 920 that can append a scrambling code sequence to a signal to uniquely identify the code set in which a user device 904 is assigned a Walsh code sequence. A modulator 922 can multiplex the signal for transmission by a transmitter 924 through transmit antenna 908 to user devices 904.

Base station 902 further comprises an assignment component 926, which can be a processor distinct from or integral to processor 914, and which can evaluate a pool of all user devices in a sector served by base station 904 and can group user devices into subsets (e.g., such as a subset of user devices 904) based at least in part on the spatial signatures of individual user devices (e.g., using an SDMA technique or the like). For instance, in a WCDMA-TDD or WCDMA-FDD communication environment, Walsh codes can be employed to uniquely delineate one user device from the next, where a user device recognizes only those communication signals that exhibit the user device's Walsh code sequence and transmits a using the same Walsh code sequence to identify itself to a base station. However, conventional WCDMA systems are limited in the number of Walsh codes that can be employed (e.g., typically 16 per sector), thus such systems exhibit an undesirable upper limit with regard to system capacity.

To provide scalability to such WCDMA systems, assignment component 926 can group user devices into subsets according to a number of users that can be supported by a set of Walsh codes. For instance, all users in a sector can be divided into subsets of 16 or fewer based at least in part on their geographic proximity to each other, and each subset can be assigned Walsh sequences in a code set. Walsh code generator 918 can generate a unique Walsh code sequence for each user device in a given code set's assigned subset. To mitigate any undesired interference between user devices with identical Walsh code sequences but in different code sets, scrambling code generator 920 can add a unique scrambling code to all signals transmitted using a particular code set. In this manner, a user device 904 can recognize a particular scrambling code as being consistent with its assigned code set, as assigned by assignment component 926, and can then determine whether the Walsh sequence with which the signal is transmitted matches the user device's assigned Walsh sequence. If so, the user device can initiate decode and processing of the signal. If not, the signal will appear as pseudo-noise to the user device.

Additionally and/or alternatively, base station 902 can comprise a hopping component 928, which can evaluate all user devices assigned to a single Walsh code sequence (e.g., across all receive antennas), and can facilitate code hopping to reduce any potential jamming effect at the base station. In this manner, multiple users can be allocated duplicate Walsh codes without interfering with one another during a communication event.

It is to be understood that although the foregoing is described with regard to scaling reverse link system capacity linearly as a number of receive antennas is increased in a TDD and/or FDD WCDMA communication environment, such techniques can be applied to forward link transmission as well using beam-forming and increasing a number of transmit antennas, as will be appreciated by one skilled in the art. Additionally, code sequence assignments can employ Walsh codes, as described above, shifted Walsh codes, or some other suitable pseudo-orthogonal code type. Moreover, according to various aspects, multiple receivers can be employed (e.g., one per receive antenna), and such receivers can communicate with each other to provide improved estimates of user data.

Figure 10:
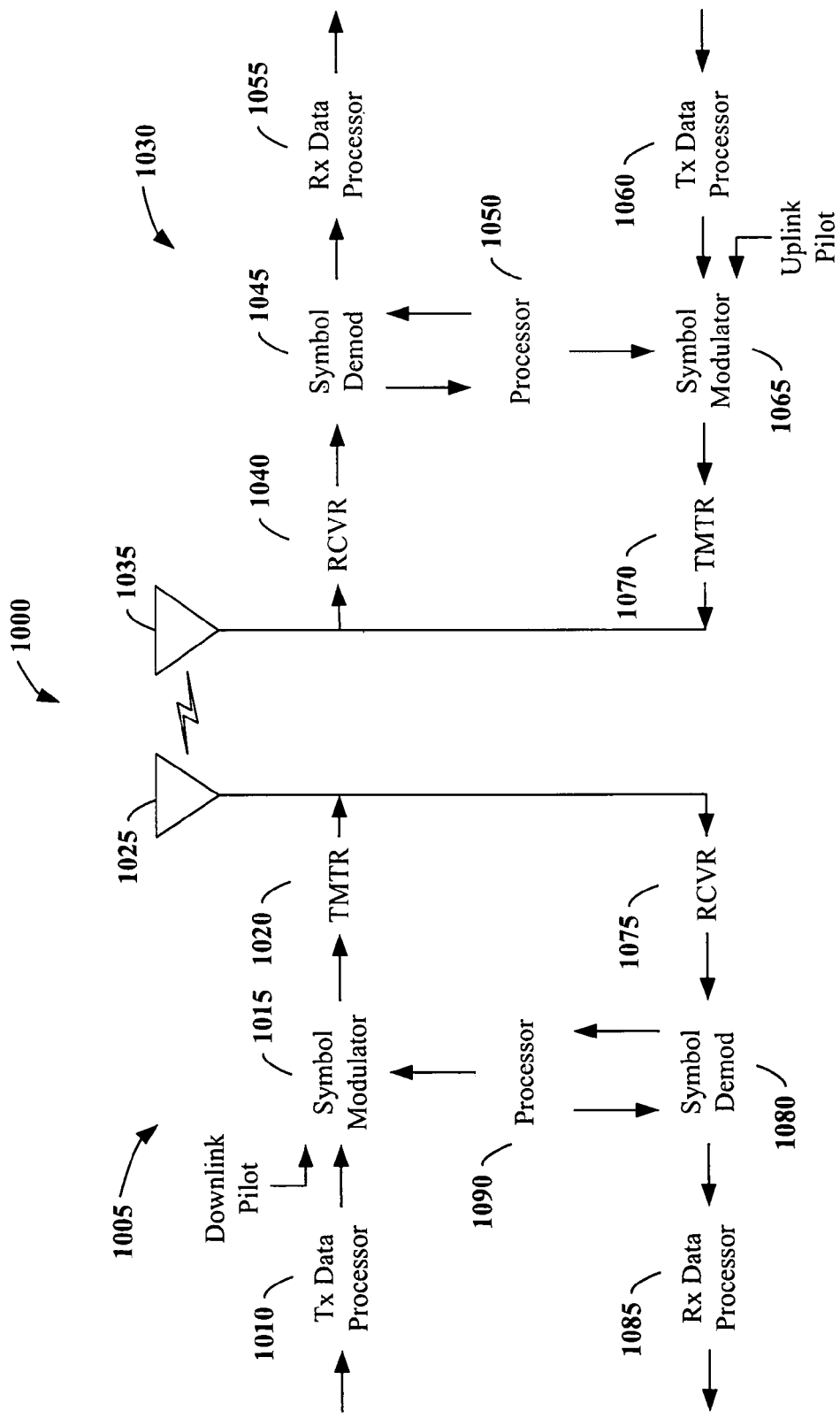
FIG. 10 is an illustration of a wireless network environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 8-9) and/or methods (FIGS. 3-6) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1035. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of increasing communication throughput in a code-division multiple access wireless communication environment, comprising:
   assigning a set of orthogonal Walsh code sequences to a first group of users in a network sector;
   assigning a duplicate set of orthogonal Walsh code sequences to at least a second set of users in the sector;
   deploying a number of receive antennas equal to the number of sets of orthogonal Walsh code sequences assigned to scale system capacity upward;
   distinguishing user devices employing the duplicate Walsh code sequence assignments, at a base station serving the sector; and
   enforcing timing offsets between user devices with duplicate Walsh code sequences to reduce jamming at the base station.

2. The method of claim 1, further comprising employing a matched filter receiver at the base station that distinguishes user devices employing duplicate Walsh code sequences from each other.

3. The method of claim 1, further comprising employing a minimum mean-squared error technique in a receiver at the base station to distinguish user devices employing duplicate Walsh code sequences from each other.

4. The method of claim 1, further comprising employing a successive interference cancellation technique in a receiver at the base station to distinguish user devices employing duplicate Walsh code sequences from each other.

5. The method of claim 1, the first set of orthogonal Walsh code sequences is completely assigned prior to assigning a duplicate Walsh code sequence in the duplicate set.

6. The method of claim 1, further comprising assessing sector channel requirements prior to Walsh code assignment, and deploying a dynamically determined number of antennas to meet the sector channel requirements.

7. The method of claim 6, wherein the dynamically determined number of antennas is equal to the number of user devices requiring a channel divided by the number of Walsh code sequences in a set, rounded upward to the nearest whole number.

8. The method of claim 7, wherein each set of Walsh codes comprises 16 orthogonal Walsh code sequences.

9. The method of claim 1, wherein the wireless communication environment is a time-division duplexed CDMA environment.

10. A wireless communication apparatus, comprising:
    a memory that stores information related to duplicate sets of orthogonal Walsh codes assigned to user devices in a sector of a wireless network;

a processor coupled to the memory, that deploys at least two antennas to at least double an amount of code space in the sector; and a hopping component that enforces timing offsets between user devices with duplicate Walsh code assignments to mitigate jamming at a base station receiving duplicate Walsh code transmissions from multiple user devices.

11. The apparatus of claim 10, wherein the processor deploys a minimum of four receive antennas and provides a minimum of four Walsh code sets for assignment to user devices, wherein sector capacity is scaled linearly with antenna number.

12. The apparatus of claim 10, further comprising a Walsh code generator that generates a first set of orthogonal Walsh codes and at least a second, duplicate set of orthogonal Walsh codes.

13. The apparatus of claim 12, wherein each set of Walsh codes comprises 16 Walsh codes that can be assigned to the user devices.

14. The apparatus of claim 13, wherein the processor assigns a complete set of Walsh codes before assigning any Walsh code in a next duplicate set of Walsh codes, to minimize a number of assigned duplicate Walsh codes.

15. The apparatus of claim 13, wherein the processor evaluates sector channel requirements and deploys a sufficient number of antennas to meet the sector requirements, which number is determined by dividing the number of user devices requiring a Walsh code assignment by the number of Walsh codes in a set and rounding the quotient upward to the nearest integer.

16. The apparatus of claim 10, further comprising a receiver that distinguishes user devices with duplicate Walsh code assignments from each other to permit timing offsets there between to be enforced.

17. The apparatus of claim 16, wherein the receiver is a matched filter receiver.

18. The apparatus of claim 16, wherein the receiver employs a minimum mean-squared error technique to distinguish duplicately assigned user devices from each other.

19. The apparatus of claim 16, wherein the receiver employs a successive cancellation technique to distinguish duplicately assigned user devices from each other.

20. The apparatus of claim 10, employed in a time-division duplexed CDMA communication environment.

21. A wireless communication apparatus, comprising:
means for generating duplicate sets of orthogonal Walsh codes;
means for assigning a first set of orthogonal Walsh codes to user devices in a network sector, and for assigning at least a second, duplicate set of orthogonal Walsh codes to user devices in the sector;
means for deploying a number of receive antennas equal to the number of sets of orthogonal Walsh codes assigned; and
means for enforcing timing offsets between the user devices with duplicate Walsh code assignments to minimize interference between such user devices.

22. The apparatus of claim 21, further comprising means for distinguishing user devices with duplicate Walsh code assignments from each other.

23. The apparatus of claim 22, wherein the means for distinguishing user devices comprises a Rake filter.

24. The apparatus of claim 22, wherein the means for distinguishing user devices comprises means for performing a minimum mean-squared error technique to distinguish between duplicately assigned user devices.

25. The apparatus of claim 22, wherein the means for distinguishing user devices comprises means for performing a successive cancellation technique to distinguish between duplicately assigned user devices.

26. The apparatus of claim 21, wherein the means for assigning assigns all Walsh codes in the first set of orthogonal Walsh codes before assigning any Walsh codes in a duplicate set of Walsh codes.

27. The apparatus of claim 21, wherein the means for deploying determines an appropriate number of antennas to deploy and associated duplicated Walsh code sets to generate, based at least in part on a number of user devices requiring a communication channel in the sector and a number of Walsh codes available in each set.

28. The apparatus of claim 27, wherein each set of Walsh codes comprises 16 Walsh codes.

29. The apparatus of claim 27, wherein the network sector employs a time-division duplexed CDMA communication protocol.

30. A non-transitory computer-readable medium having stored thereon computer-executable instructions when executed by a computer for:
assigning a set of orthogonal Walsh code sequences to a first group of users in a time-division CDMA network sector;
assigning at least one duplicate set of orthogonal Walsh code sequences to at least a second set of users in the sector;
distinguishing user devices employing duplicate Walsh code sequence assignments, at a base station serving the sector;
enforcing timing offsets between the user devices employing duplicate Walsh code sequences to reduce a potential jamming effect at a base station receiving communication signals from the user devices; and
deploying a number of receive antennas equal to a number of sets of orthogonal Walsh code sequences to be assigned.

31. A processor that executes instructions for increasing throughput in a wireless communication environment, the instructions comprising:
assigning a set of orthogonal Walsh code sequences to a first group of users in a time-division duplexed CDMA network sector;
assigning at least one duplicate set of orthogonal Walsh code sequences to at least a second set of users in the sector;
deploying a receive antenna for each set of orthogonal Walsh code sequences, such that the number of receive antennas in the sector is equal to the number of code sets to be assigned; and
distinguishing user devices employing duplicate Walsh code sequence assignments and enforcing timing offsets there between, at a base station serving the sector.

32. A method for increasing throughput in a wireless communication device, comprising:
assigning an orthogonal Walsh code sequence to a first user device in a sector;
assigning the orthogonal Walsh code sequence to a second user device in the sector; and
enforcing, using hardware, a timing offset between transmissions using the orthogonal Walsh code sequence from the first and second user devices.

33. A wireless communication apparatus, comprising a processor configured to enforce a timing offset between transmissions using a duplicate orthogonal Walsh code sequence from user multiple devices.

34. A wireless communication apparatus, comprising hardware means for enforcing a timing offset between transmissions using a duplicate orthogonal Walsh code sequence from multiple user devices.

35. A non-transitory computer-readable medium, comprising instructions stored thereon that, if executed by a processor, cause the processor to enforce a timing offset between transmissions using a duplicate orthogonal Walsh code sequence from multiple user devices.

36. A method for increasing throughput in a wireless communication device, comprising:
  assigning an orthogonal Walsh code sequence to a first user device in a sector;
  assigning the orthogonal Walsh code sequence to a second user device in the sector; and
  identifying the first and second user devices from each other by using hardware to perform a minimum mean-squared error technique.

37. A wireless communication apparatus, comprising a processor configured to identify multiple user devices, having duplicate Walsh code assignments, by performing a minimum mean-squared error technique.

38. A wireless communication apparatus, comprising hardware means to identify multiple user devices, having duplicate Walsh code assignments, by performing a minimum mean-squared error technique.

39. A non-transitory computer-readable medium, comprising instructions stored thereon that, if executed by a processor, cause the processor to identify multiple user devices, having duplicate Walsh code assignments, by performing a minimum mean-squared error technique.

* * * * *